United States Patent [19]
Jülke et al.

[11] Patent Number: 5,684,664
[45] Date of Patent: Nov. 4, 1997

[54] METHOD FOR THE PRODUCTION OF AN INSULATOR

[75] Inventors: Elias Jülke, Wettingen; Walter Schmidt, Bellikon, both of Switzerland

[73] Assignee: Asea Brown Boveri AG, Baden, Switzerland

[21] Appl. No.: 585,573

[22] Filed: Jan. 16, 1996

[30] Foreign Application Priority Data

Feb. 11, 1995 [DE] Germany ............... 195 04 532.7

[51] Int. Cl.$^6$ ..................................... H02H 9/06
[52] U.S. Cl. ............................. 361/117; 29/887
[58] Field of Search ..................... 361/111, 117, 361/118, 126, 127; 338/21; 29/885, 887; 106/21 A, 22 R; 523/200; 73/104; 118/72, 244; 427/8–10, 470, 553, 208.8

[56] References Cited

U.S. PATENT DOCUMENTS 4,125,507 11/1978 Kummins et al. .............. 106/22 R

FOREIGN PATENT DOCUMENTS

| | | |
|---|---|---|
| 0335479A2 | 10/1989 | European Pat. Off. . |
| 0545038A1 | 6/1993 | European Pat. Off. . |
| 1198431 | 8/1965 | Germany . |
| 3342855A1 | 6/1985 | Germany . |
| 4109397A1 | 9/1992 | Germany . |
| 4318997A1 | 12/1993 | Germany . |
| 4305991C1 | 6/1994 | Germany . |

*Primary Examiner*—Jeffrey A. Gaffin
*Assistant Examiner*—Ronald W. Leja
*Attorney, Agent, or Firm*—Burns, Doane, Swecker & Mathis, L.L.P.

[57] ABSTRACT

An electrical insulator coated with electrically insulating material is disclosed. An electrically insulating material is applied on a primer coat, in which the uniformity of the applied primer coat can be checked in a comparatively simple manner. A fluorescent material is dissolved in the primer solution before being applied to the component. Once dry, the primer coat is exposed to ultraviolet light, which causes the fluorescent material to fluoresce. Points on the surface of the component where the primer defectively coats the components are optically detected from the absence of fluorescent material. Primer is then reapplied to these points.

7 Claims, 3 Drawing Sheets

METHOD FOR THE PRODUCTION OF AN INSULATOR

BACKGROUND OF THE INVENTION

1. Field of the Invention

The invention relates to a method for the production of an insulator.

2. Discussion of Background

EP-A1-0,545,038 discloses a surge voltage protector which is encapsulated in an electrically insulating material. This surge voltage protector has two end fittings braced relative to each other by slightly axially resilient plastic strips. The plastic strips are positively inserted into the end fittings. The surge voltage protector has cylindrically designed varistor elements superposed to form a stack. A spacer plate is provided between the stack and the respective connection end fitting, which spacer plate is pressed against the stack by means of a threaded bolt screwed into the end fitting. The end fittings form the ends of the stack of varistor elements. Grooved disks for providing better contact are provided between the individual varistor elements and between the varistor elements and the electrically conducting spacer plates. The abovedescribed component is potted with insulating material.

Care must be taken that the component surface that comes into contact with the insulating material is not contaminated by grease or other materials which could impair the adhesion of the insulating material. Poor adhesion would produce the risk of formation of an undesired track along the surface of the varistor elements. Adhesion is often improved with the aid of a primer coat which is applied onto the varistor elements. Conventional primers are colorless, so that is not possible in a simple manner to check the quantity applied and its uniform distribution. In particular, points which have not received any primer application are also not simple to detect. Moisture can diffuse in at these points, which sooner or later leads to longitudinal electrical breakdowns in the boundary layer between the varistor elements and the insulating material.

SUMMARY OF THE INVENTION

Accordingly, one object of the invention, as it is described in the independent claims, is to provide a novel method for the production of an insulator having electrically insulating material applied on a primer coat, in which the uniformity of the applied primer coat can be checked in a comparatively simple manner. An insulator produced according to this method is also provided.

Checking of the uniformity of the applied primer coat is carried out by optical means and is free of interference. Defective points in the primer coat are simple to repair. The checking method can be used economically both for large and for comparatively small production runs. Insulators which are provided with a uniform primer coat have improved operational reliability, so that distribution networks equipped with such insulators have a considerably lower number of mains failures attributable to insulator faults. In particular, the operational reliability of surge voltage protectors is also increased if their active parts are provided with a uniform primer coat which is easy to check, before they are encapsulated in an insulating material.

Further developments of the invention constitute the subject-matter of the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
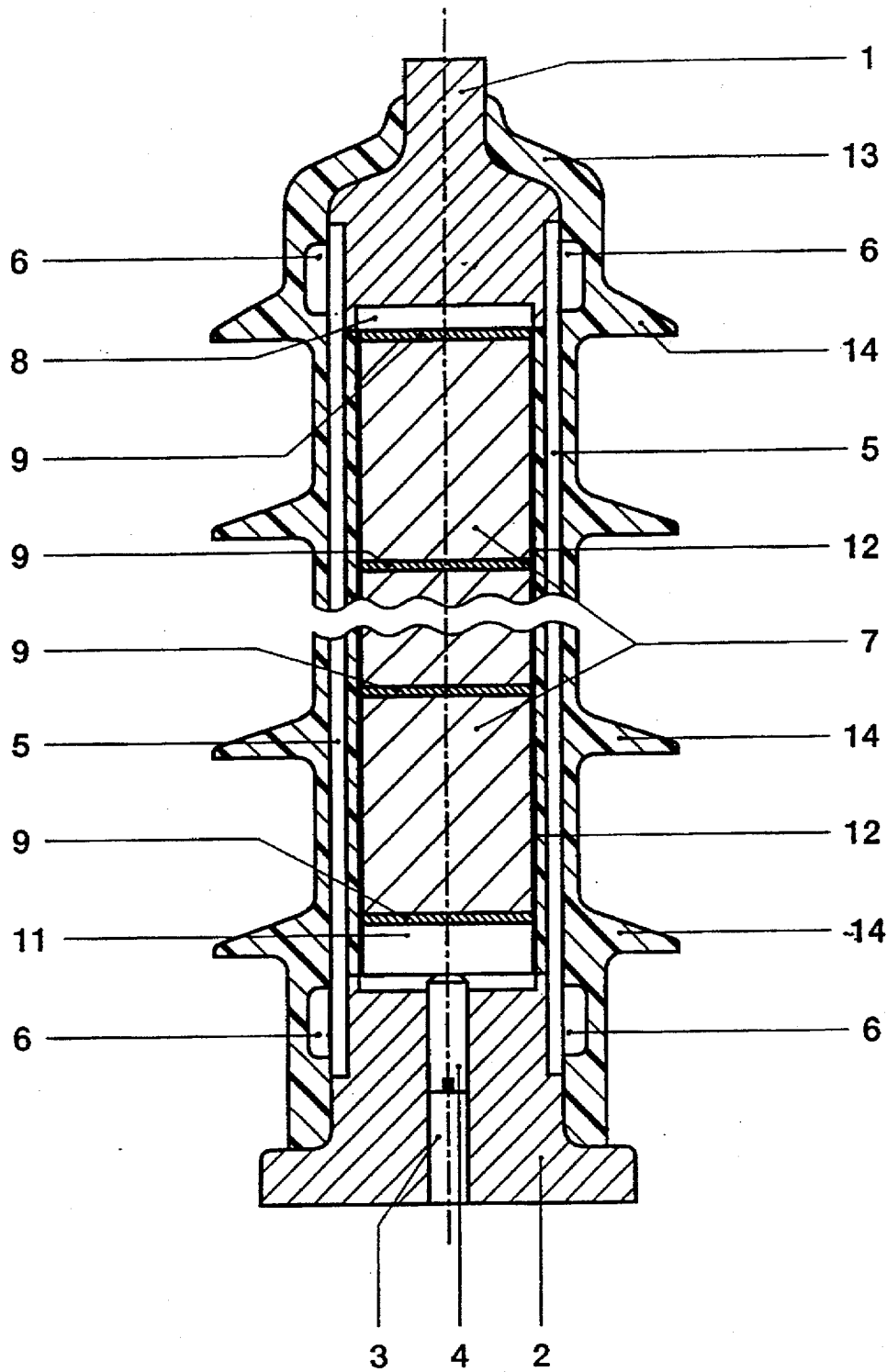
FIG. 1 shows a longitudinal section through a surge voltage protector encapsulated in insulating material.

Referring now to the drawings, wherein like reference numerals designate identical or corresponding parts throughout the several views, FIG. 1 shows a schematic representation of a longitudinal section through a surge voltage protector provided with an outer insulation. The surge voltage protector has two metal connection end fittings 1, 2. Connection end fitting 1 is, like connection end fitting 2, provided with a fastening facility (not represented) for an electrical conductor. A threaded bore 3, in which a pressure screw 4 is arranged, is centrally provided in the connection end fitting 2. The two connection end fittings 1, 2 are connected together by two rigid, but to some extent axially extensible, glass-fiber reinforced plastic strips 5. These plastic strips 5 are fastened to the connection end fittings 1, 2 by means of screws 6. The plastic strips 5 have, for example, a rectangular cross section and are arranged symmetrically relative to the longitudinal axis of the surge voltage protector. The rectangular plastic strips 5 are positively embedded in the surface of the respective connection end fitting 1 or 2.

The frame formed by the connection end fittings 1, 2 and the plastic strips 5 encloses cylindrically designed varistor elements 7 superposed to form a stack. ZnO, for example, may be used as the varistor material. A matching metal plate 8 is inserted into a recess in the connection end fitting 1. A cylindrically designed grooved disk 9, which has a central bore 10, is placed between the plate 8 and the next varistor element 7, as well as between neighboring varistor elements 7. A grooved disk 9, which rests on a pressure plate 11, is likewise provided after the bottom varistor element 7. The pressure screw 4 acts on the pressure plate 11 and guides the current that flows when the surge voltage protector operates from the pressure plate 11 to the connection end fitting 2. When the described active parts are introduced into the frame, care should be taken that no gaps, in which insulent can enter during potting, remain open between the individual parts of the cylindrically designed stack. The actual contact force between the active parts and the connection end fittings 1, 2 is produced by the pressure screw 4, which is tightened with a predetermined torque and subsequently secured in one of the known ways. A preassembled component is in this way created.

This preassembled component then has all possibly accumulated grease and salt residues cleaned off with the aid of a solvent. Acetone or isopropanol, for example, are used as the solvent. The cleaning of the component is followed by a drying process. The preassembled component is thereupon coated with a primer solution, and specifically, all regions, in particular including the plastic strips 5, which are covered with the insulating material during the subsequent potting, are provided with a comparatively thin, only a few μm thick, continuous primer coat. Approximately 0.5 μm to 5 μm is generally desired as the thickness of the dry primer coat. In FIG. 1, for the sake of better clarity and substantially thicker than what would correspond to the scale of the drawing, only the primer coat 12 is represented, which externally covers the cylindrically designed varistor elements 7, the grooved disks 9 and the pressure plate 11.

The component thus provided with the primer coat 12 is placed in a mold and potted without gaps and holes with a covering 13 of electrically insulating plastic. Suitable plastics in this case are, for example, silicone elastomers. During potting, insulating shields 14 are simultaneously molded onto the covering 13. The entire component is surrounded with the covering 13 and only those parts of the connection end fittings 1, 2 that are required for electrical connections remain metallic blank.

Figure 2:
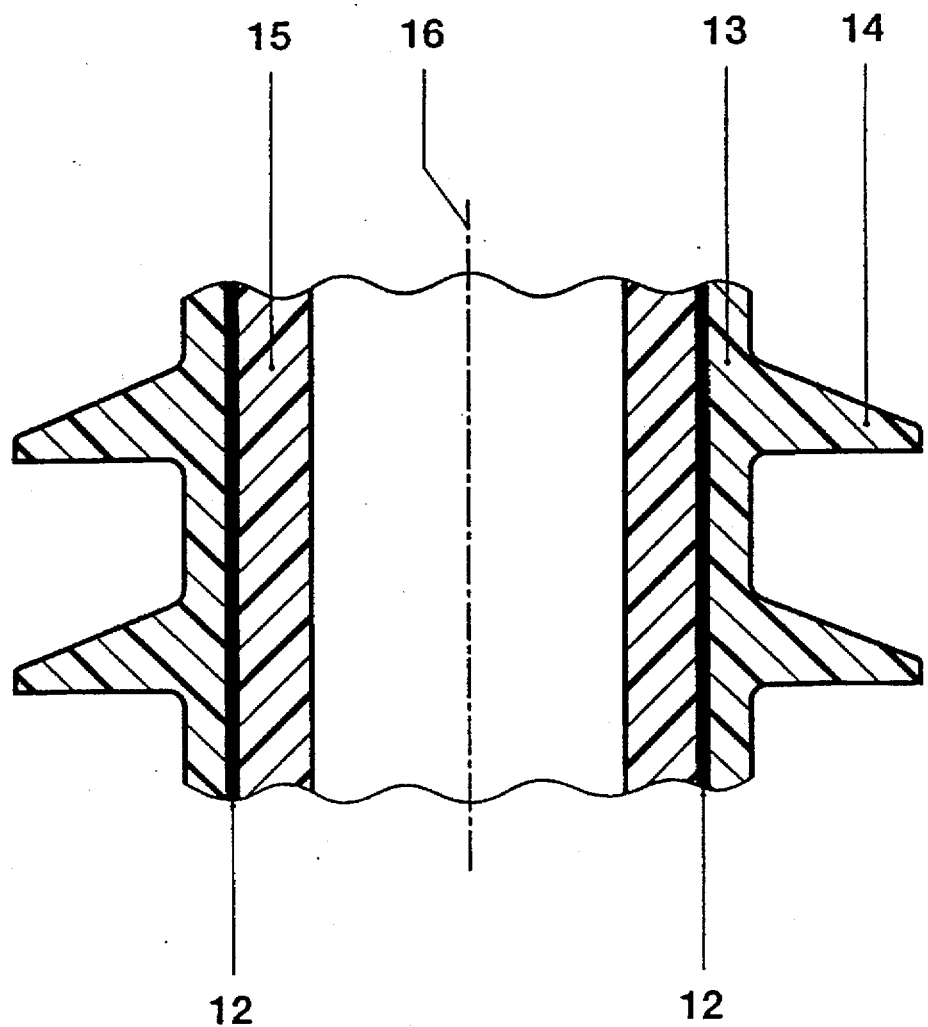
FIG. 2 shows a partial section through a post insulator.

FIG. 2 shows a simplified partial section through a hollow post insulator. This insulator could, however, for example also be used as the enclosure of an arcing chamber or of an interrupter chamber of outdoor switch gear. Insulators are also possible which do not have a cavity in their interior. In the case of this post insulator, a cylindrically designed, fiber-reinforced insulating tube 15, which has an axis 16, is the only supporting element which is connected at each end to connection flanges (not represented) which are intended for mechanical connection of the post insulator to neighboring modules. The insulating tube 15 is, after a cleaning process employing acetone or isopropanol, provided on the outside with a primer coat 12 which is, for the sake of better clarity, represented as being very thick. This primer coat 12 is, however, also in this case only a few μm thick. Approximately 0.5 μm to 5 μm is generally desired as the thickness of the dry primer coat 12. The insulating tube 15 provided with the primer coat 12 is externally potted as far as the connection flanges with a covering 13 of insulating material, shields 14 being simultaneously molded onto this covering 13.

Figure 3:
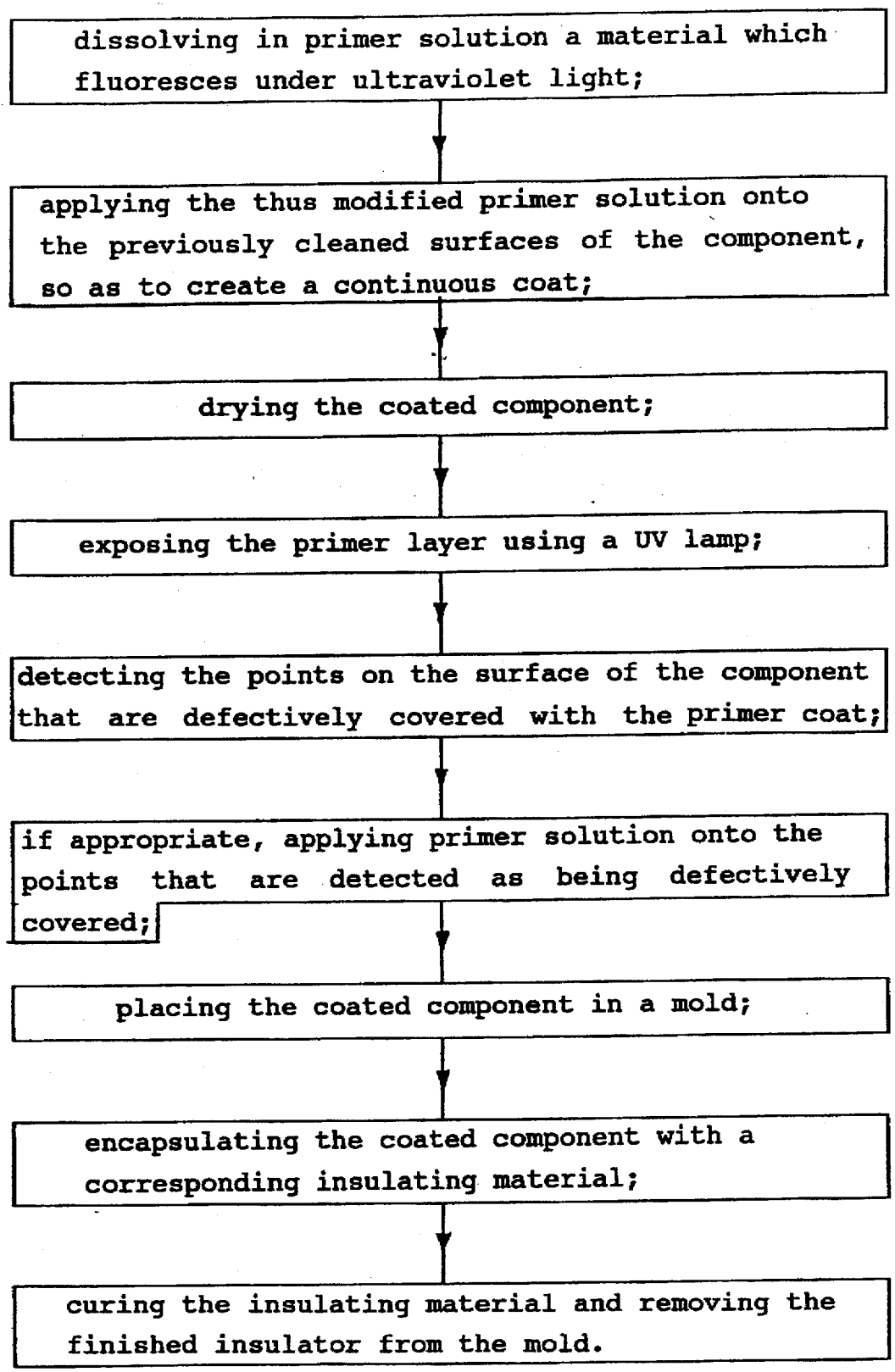
FIG. 3 shows a block diagram of one embodiment of the method according to the invention for producing the surge voltage protector according to FIG. 1.

FIG. 3 represents as a block diagram the method for the production of an insulator having at least one encapsulated component. This method has the following procedural steps:

a) dissolving a material which fluoresces under ultraviolet light in the primer solution;

b) applying the thus modified primer solution onto the previously cleaned surfaces of the component, so as to create a continuous coat;

c) drying the coated component;

d) exposing the primer layer 12 using a UV lamp;

e) detecting the points on the surface of the component that are defectively covered with the primer coat 12;

e) if appropriate, applying primer solution onto the points that are detected as being defectively covered;

f) placing the coated component in a mold;

g) encapsulating the coated component with a corresponding insulating material;

h) curing the insulating material and removing the finished insulator from the mold.

In both of the embodiments described, a primer solution of the company Wacker Chemie GmbH, PO Box 1260, D 84480 Burghausen, type "GRUND G 790" was used. This primer solution contains an organosilane compound which is dissolved in an aliphatic solvent naphtha. The primer solution contains as solvent 50% of aliphatic hydrocarbons and additionally 2% of silicic-acid esters. A dye of the company Ciba-Geigy, CH 4002 Basel, type "UVITEX-OB" was mixed with this primer solution as material reflecting ultraviolet light. This dye is normally used in the paper industry and also in detergents as an optical brightener. 0.5 per cent by weight of this dye was mixed with the primer solution. If somewhat more dye is admixed, then the undissolved dye component settles on the bottom of the vessel, and the processability of the primer solution is not thereby negatively influenced. The dye is likewise soluble in the solvent naphtha used for the primer solution, but only in a comparatively low concentration. The addition of only 0.5 per cent by weight of the dye leads to a solution that is saturated with "UVITEX-OB".

After the dye has been dissolved in the primer solution, this solution is applied onto the component using one of the conventional methods, depending on the dimensions of the component and on the number of insulators to be produced. An immersion method or a spraying method could, for example, be used for the application, but it is also possible in small production runs to use simple application using a brush. The application is followed by a first drying process referred to as air drying, in which the primer-coated component is kept, for example, for 30 minutes at ambient temperature, so that most of the solvent can evaporate. This first drying process is followed by a second drying process, in which the primer-coated component is further dried, for example, at temperatures in the vicinity of 100° C. for one hour. During the vaporization of the solvent naphtha used as solvent, which accompanies the drying, supersaturation of the solution takes place, and consequently precipitation of "UVITEX-OB" particles. These particles have their full fluorescence after precipitation.

After this drying of the applied primer coat 12, the uniformity of this coat is checked under dark conditions with the aid of a UV lamp. The "UVITEX-OB"dye used here displays particularly strong fluorescence if it is exposed to near-UV light of wavelength 340 nm. Wherever fluorescent light cannot be detected, the surface of the component has points which have not been coated with the primer, and these points must be deliberately covered up by reapplication of the primer solution in this region, so that a continuous and sealed primer coat 12 is provided after the subsequent drying. Wherever the fluorescent light that can be detected is particularly intense compared to the rest of the surface of the component, the thickness of the primer layer 12 is somewhat too thick. Applying the primer too thickly somewhat reduces the adhesion of the insulating material to the component, and should therefore be avoided.

Tests were also carried out using a primer solution of the company Bayer AG, Olof-Palme-Strasse 15, D 51371 Leverkusen, with the trade reference SILOPREN-HALFMITTEL Z 3042, this primary solution having been modified by the addition of the above dye, and these tests also produced very good results.

For the potting or coating of the component, the silicone elastomers of the company Bayer AG, Olof-Palme-Strasse 15, D 51371 Leverkusen, with the trade names SILOPREN LSR 2530 or SILOPREN LSR 2250 are particularly well suited. The silicone elastomers of the company RADO Gummi GmbH, PO Box 1480, D 42463 Radevormwald, with the trade names SILOPREN LB SI 419 AI or SILOPREN LB SI 419 AII can also advantageously be used in this case. In addition, the silicone elastomers of the company Wacker Chemie GmbH, PO Box 1260, D 84480 Burghausen, with trade names POWERSIL 660 or POWERSIL 661 or POWERSIL 310 or POWERSIL 311 can also be used for this purpose.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for the production of an insulator having at least one component coated with electrically insulating material, in which a primer solution is applied onto the at least one component, in which the applied primer solution is dried to form a primer coat, after which the electrically insulating material is applied onto the primer coat, wherein the following procedural steps are carried out before application of the electrically insulating material:

a) dissolving a material which fluoresces under ultraviolet light in the primer solution in an amount sufficient to saturate said primer solution, b) precipitating said fluorescent material from said saturated primer solution, c) exposing the primer coat to a light source, d) detecting the points on the surface of the at least one component that are defectively covered with the primer coat, and e) if appropriate, applying primer solution onto the points on the surface of the at least one component that are detected as being defectively covered.

2. The method as claimed in claim 1, wherein 0.5 per cent by weight of the material that fluoresces under ultraviolet light is dissolved in the primer solution.

3. The method as claimed in claim 1, wherein the electrically insulating material is applied using a method selected from the group consisting of molding and pressing.

4. The method as claimed in claim 1, wherein said primer solution comprises an organosilane compound dissolved in an aliphatic solvent naphtha, and the material that fluoresces under ultraviolet light comprises a dye soluble in naphtha.

5. An insulator, produced according to a method according to claim 1, comprising at least one component provided with said primer coat and having electrically insulating material which is applied onto said primer coat, wherein said primer coat contains said material that fluoresces when exposed to light.

6. The insulator as claimed in claim 5, wherein at least one supporting tube of insulating material is provided as the component.

7. The insulator as claimed in claim 5, wherein at least one varistor element having corresponding connection end fittings is provided as the component.

* * * * *